(12) United States Patent
Murofushi et al.

(10) Patent No.: US 8,882,182 B2
(45) Date of Patent: Nov. 11, 2014

(54) COWL STRUCTURE FOR AN AUTOMOBILE

(75) Inventors: Shinichiro Murofushi, Toyota (JP); Hiroki Nomura, Toyota (JP); Shinsuke Yoshizawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/983,147

(22) PCT Filed: Feb. 24, 2011

(86) PCT No.: PCT/JP2011/054147
§ 371 (c)(1),
(2), (4) Date: Aug. 1, 2013

(87) PCT Pub. No.: WO2012/114496
PCT Pub. Date: Aug. 30, 2012

(65) Prior Publication Data
US 2013/0320712 A1    Dec. 5, 2013

(51) Int. Cl.
*B62D 25/08* (2006.01)
*B60R 21/34* (2011.01)

(52) U.S. Cl.
CPC .............. *B62D 25/081* (2013.01); *B60R 21/34* (2013.01); *B60R 2021/343* (2013.01)
USPC ................... 296/192; 296/187.04; 296/187.09

(58) Field of Classification Search
CPC ........ B62D 25/08; B62D 25/081; B60H 1/28; B60R 21/34
USPC .......... 296/187.04, 193.02, 208, 192, 203.02, 296/187.09, 193.09, 96.21
See application file for complete search history.

(56) References Cited

U.S. PATENT DOCUMENTS

| | | | | |
|---|---|---|---|---|
| 5,061,009 A * | 10/1991 | Harasaki et al. | ............... | 296/192 |
| 6,565,148 B1 * | 5/2003 | Teramoto et al. | ............. | 296/192 |
| 7,316,448 B2 * | 1/2008 | Koyama et al. | ............... | 296/192 |
| 7,854,473 B2 * | 12/2010 | Kuroita et al. | ........... | 296/203.02 |
| 8,002,335 B2 * | 8/2011 | Usuda | ............................ | 296/192 |
| 8,474,901 B2 * | 7/2013 | Serizawa et al. | ............... | 296/192 |
| 8,567,851 B2 * | 10/2013 | Morden et al. | ................ | 296/192 |
| 8,579,365 B2 * | 11/2013 | Makise et al. | ................ | 296/192 |
| 8,702,155 B2 * | 4/2014 | Suzuki | .......................... | 296/192 |
| 2011/0076435 A1 | 3/2011 | Tachibana et al. | | |
| 2012/0091756 A1 * | 4/2012 | Suzuki | .......................... | 296/192 |
| 2012/0126577 A1 * | 5/2012 | Horimizu | ...................... | 296/192 |

(Continued)

FOREIGN PATENT DOCUMENTS

| | | | | |
|---|---|---|---|---|
| JP | 4-39174 | * | 2/1992 | ............ B62D 25/08 |
| JP | U-04-084082 | | 7/1992 | |

(Continued)

OTHER PUBLICATIONS

Dec. 17, 2013 Notice of Allowance issued in Japanese Patent Application No. 2013-500786 (with English translation).

*Primary Examiner* — Gregory Blankenship
(74) *Attorney, Agent, or Firm* — Oliff PLC

(57) ABSTRACT

A cowl structure for an automobile that may both impede movements of air and guide moisture in a cowl portion, even with a small number of components. Plural screen plates and a guide plate are disposed inside the cowl portion. The screen plate and screen plate impede movements of air in the cowl portion. The guide plate guides water inside the cowl portion to a vehicle forward side thereof. The screen plate and screen plate are joined by the guide plate.

9 Claims, 14 Drawing Sheets

(56) References Cited

U.S. PATENT DOCUMENTS

| | | | | |
|---|---|---|---|---|
| 2013/0300154 A1 | * | 11/2013 | Schaefer | 296/192 |
| 2013/0320712 A1 | * | 12/2013 | Murofushi et al. | 296/192 |

FOREIGN PATENT DOCUMENTS

| | | | | |
|---|---|---|---|---|
| JP | U-05-037657 | | 5/1993 | |
| JP | 6-1264 | * | 1/1994 | B62D 25/08 |
| JP | A-2004-058722 | | 2/2004 | |
| JP | A-2007-125995 | | 5/2007 | |
| JP | A-2009-067329 | | 4/2009 | |
| JP | 2009154834 | * | 7/2009 | B62D 25/08 |
| JP | A-2010-006313 | | 1/2010 | |
| JP | A-2010-168036 | | 8/2010 | |
| JP | 2012148630 | * | 8/2012 | B62D 25/08 |

* cited by examiner

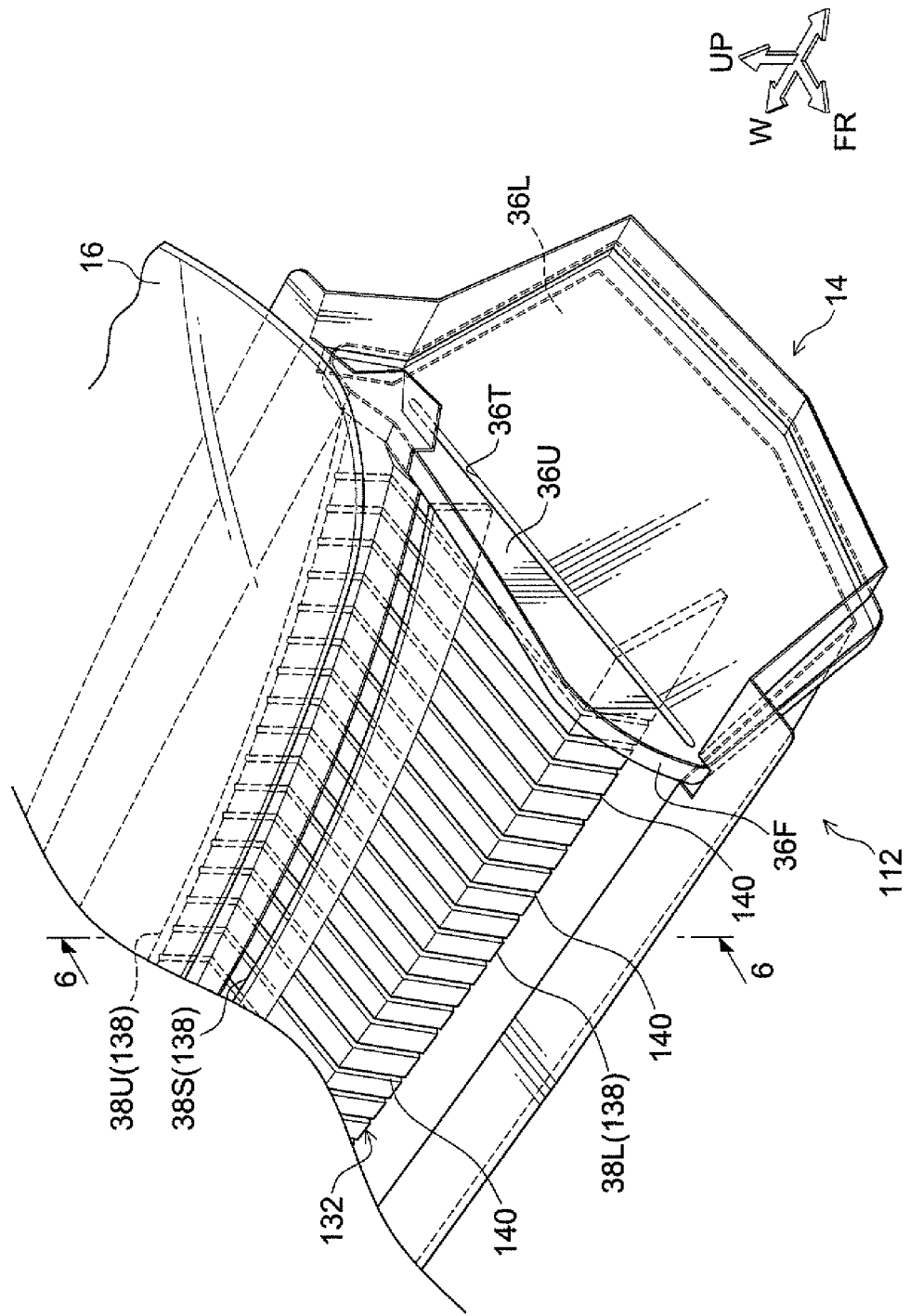

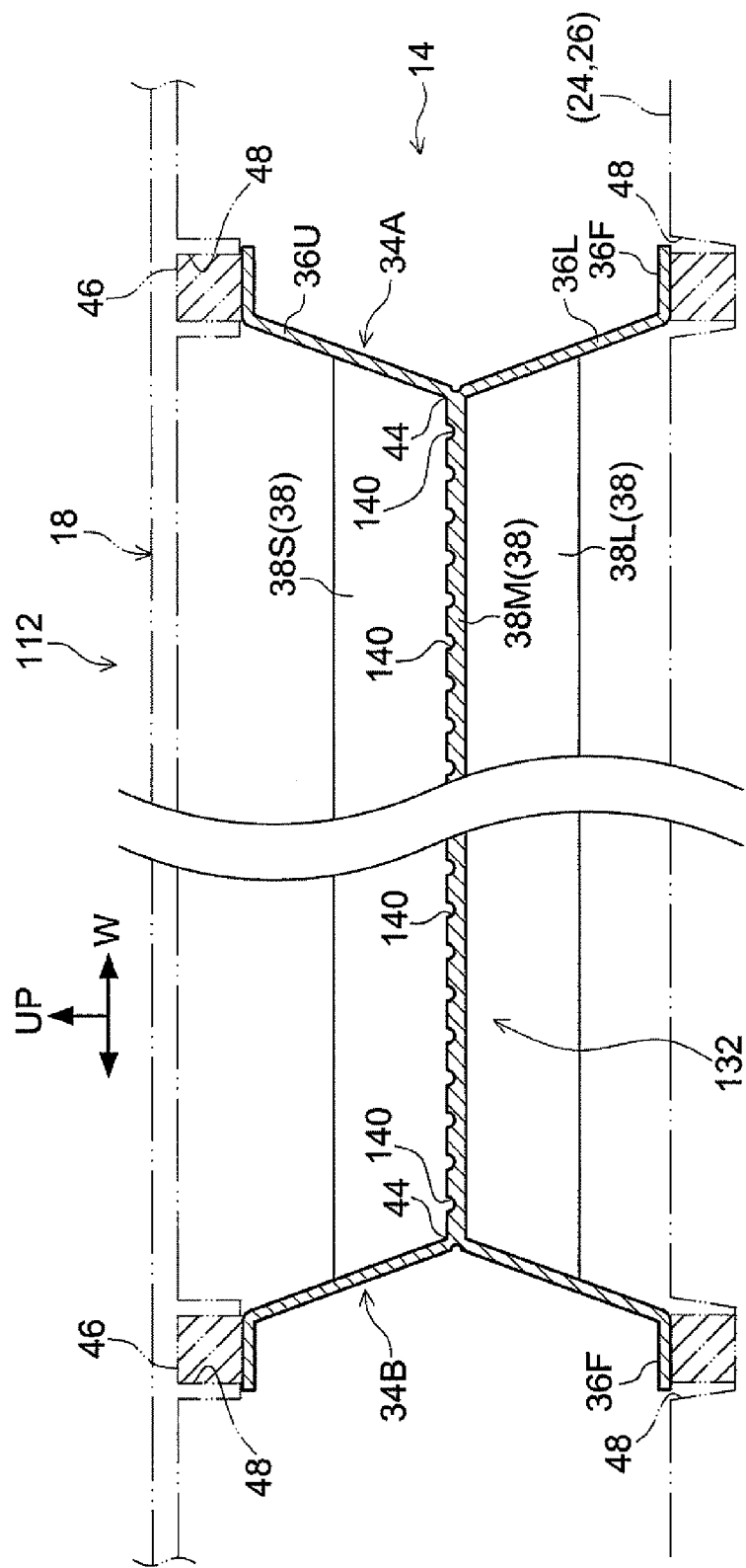

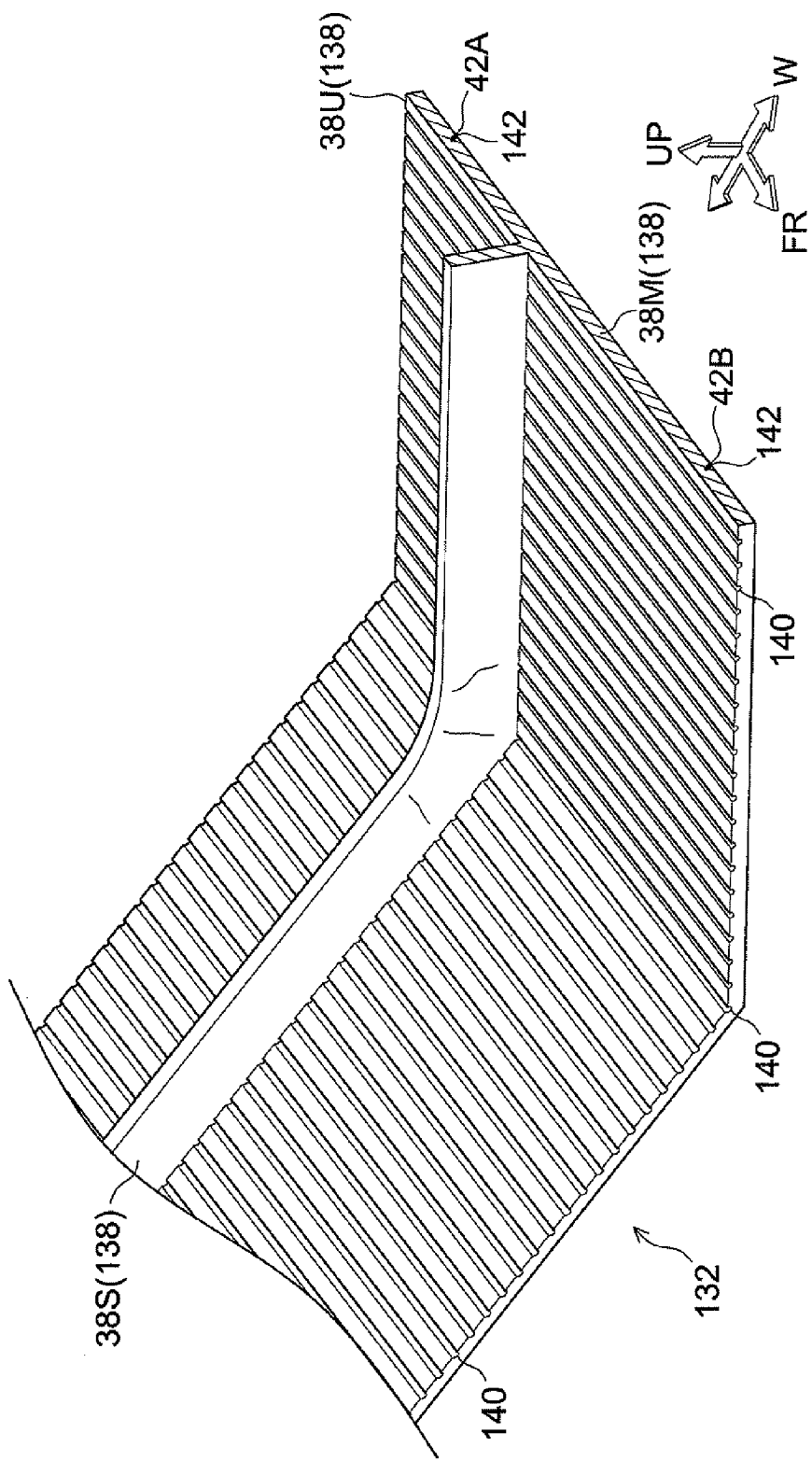

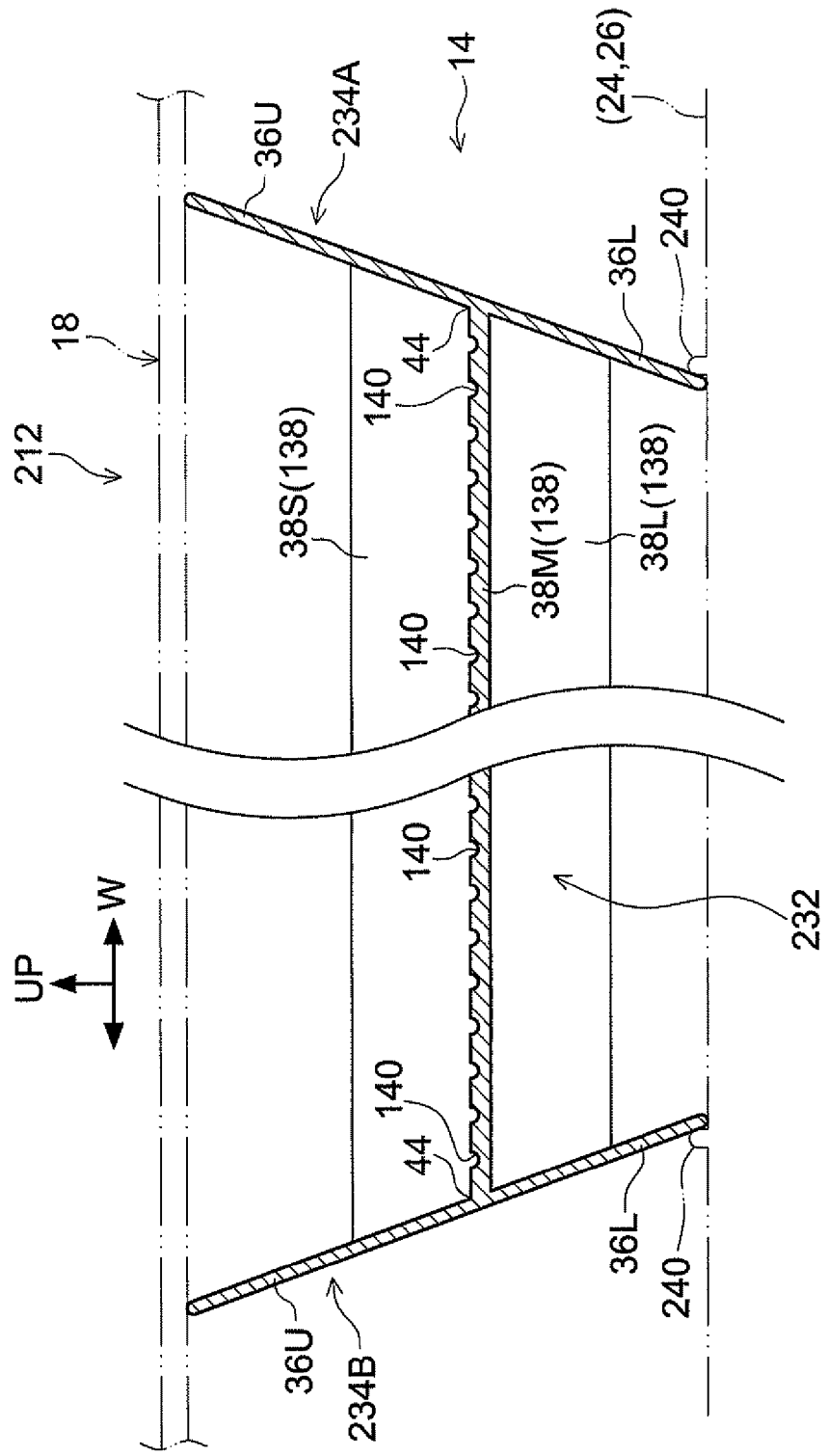

COWL STRUCTURE FOR AN AUTOMOBILE

TECHNICAL FIELD

The present invention relates to a cowl structure for an automobile.

BACKGROUND ART

As a cowl structure for an automobile, Patent Document 1 (Japanese Patent Application Laid-Open (JP-A) No. 2009-67329) recites a cowl structure that includes, inside a cowl, a shield member that prevents the entry of air from an engine compartment.

Meanwhile, Patent Document 2 (JP-A No. 2007-125995) recites a structure that is provided with a lower louver portion and a cowl duct, such that rainwater, washing water or the like in air that enters through an outside air inlet aperture can be guided so as not to pass through a cavity (a duct aperture portion) into a vehicle cabin.

If an automobile cowl portion is simply provided with members that impede movements of air, members that guide moisture and the like in this manner, a number of components is increased, both making assembly more difficult and leading to higher costs.

DISCLOSURE OF INVENTION

Technical Problem

In consideration of the circumstances described above, an object of the present invention is to provide a cowl structure for an automobile that may both impede air movements and guide water in a cowl portion, even with a small number of components.

Solution to Problem

A first aspect of the present invention includes: a plural number of screen plates that are provided standing inside a cowl portion of a vehicle, the screen plates impeding movement in a vehicle width direction of air that enters from a power plant compartment; and a guide plate that guides at least liquid that ingresses into the cowl portion through a cowl louver toward a vehicle forward side, the guide plate joining the plurality of screen plates.

Thus, movements in the vehicle width direction of air entering from the power plant compartment may be impeded by the plural screen plates provided standing in the cowl portion. Moreover, liquid that ingresses inside the cowl portion through the cowl louver may be guided toward the vehicle forward side by the guide plate.

The plural screen plates are joined by the guide plate. That is, the plural screen plates and the guide plate are made integral. Therefore, a number of components is smaller than in a structure in which plural screen plates and a guide plate are respectively separate bodies.

In a second aspect of the present invention, in the first aspect, at least a portion of each of the plural screen plates, at at least one of an upper side portion and a lower side portion relative to a boundary between the screen plate and the guide plate, is an inclined portion that is inclined from a vertical direction.

Accordingly, the inclined portion is inclined such that the inclination angle thereof increases when a load acts on the screen plate from vertically upward thereof. Thus, an impact of the load may be absorbed.

In a third aspect of the present invention, in the second aspect, the inclined portion includes: an upper inclined portion at the upper side relative to a region of the boundary; and a lower inclined portion at the lower side relative to the region of the boundary, the lower inclined portion being inclined in a different direction from the upper inclined portion, and a low-stiffness portion, at which the screen plate is locally low in stiffness, is provided between the upper inclined portion and the lower inclined portion.

Thus, the screen plate is in a shape that is inflected at the boundary region. This screen plate deforms so as to inflect further at the boundary region (the angle in the inflection becomes smaller) when a load acts on the shield plate from vertically upward thereof. Thus, the impact of the load may be more efficiently absorbed.

In a fourth aspect of the present invention, in the first aspect, each of the plural screen plates is flat and is disposed to be inclined with respect to a vertical direction.

Thus, when a load acts on the screen plate from vertically upward thereof, the whole screen plate inclines further while keeping the flat shape. Thus, an impact of the load may be absorbed.

In a fifth aspect of the present invention, in any one of the first to fourth aspects, the guide plate includes a weakened portion at which a bending strength of the guide plate with respect to a load from a vehicle outer side is reduced.

Thus, when a load acts on the guide plate from the vehicle outer side, the guide plate deforms by bending in accordance with the weakened portion at which the bending strength of the guide plate is reduced. Thus, an impact of the load may be absorbed.

In a sixth aspect of the present invention, in the fifth aspect, the weakened portion is a reduced plate thickness portion at which the guide plate is locally reduced in thickness along an up-and-down direction.

Thus, the weakened portion may be provided with a simple structure in which the weakened portion is simply formed along the up-and-down direction of the guide plate.

In a seventh aspect of the present invention, in the fifth aspect or the sixth aspect, the weakened portion is plurally provided, the weakened portions being spaced apart in a vehicle width direction.

Because the weakened portion is plurally provided at intervals in the vehicle width direction, the guide plate as a whole may produce a deformation sufficient to absorb a load.

Advantageous Effects of Invention

Because the present invention is configured as described above, at a cowl portion, movements of air may be impeded and moisture may be guided, even with a small number of components.

BRIEF DESCRIPTION OF DRAWINGS

FIG. 5 is a perspective diagram partially showing an automobile cowl structure in accordance with a second exemplary embodiment of the present invention.

FIG. 6 is a sectional diagram taken along line 6-6 of FIG. 5, showing the automobile cowl structure in accordance with the second aspect of the present invention.

FIG. 9 is a partially cutaway sectional diagram showing the screen plate structural body that is used in the automobile cowl structure in accordance with the second exemplary embodiment of the present invention in a deformed state.

FIG. 10 is a sectional diagram showing an automobile cowl structure in accordance with a third exemplary embodiment of the present invention, in a state in which a screen plate structural body is undeformed.

BEST MODE FOR CARRYING OUT THE INVENTION

Figure 1:
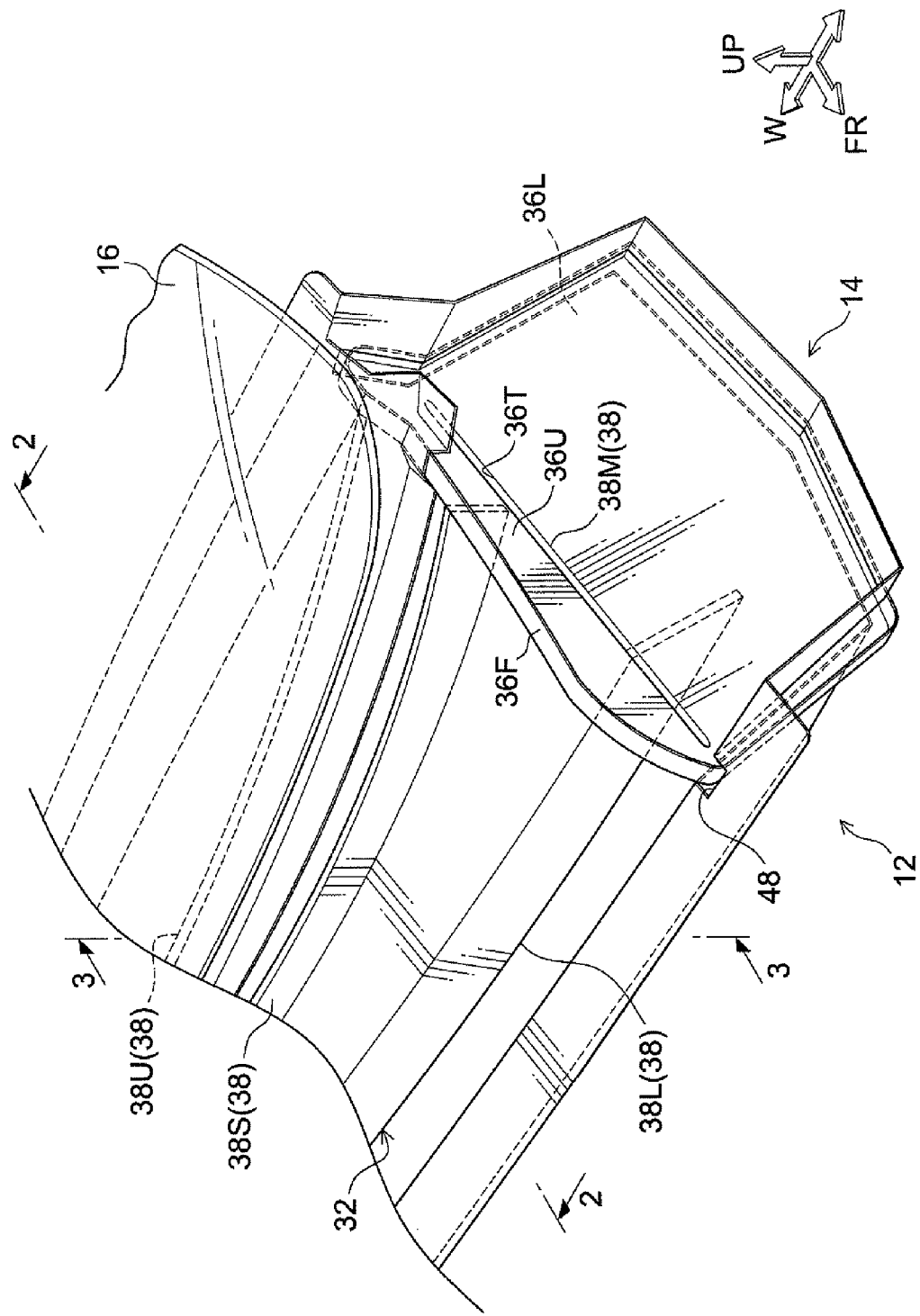
FIG. 1 is a perspective diagram partially showing an automobile cowl structure in accordance with a first exemplary embodiment of the present invention.
Figure 2:
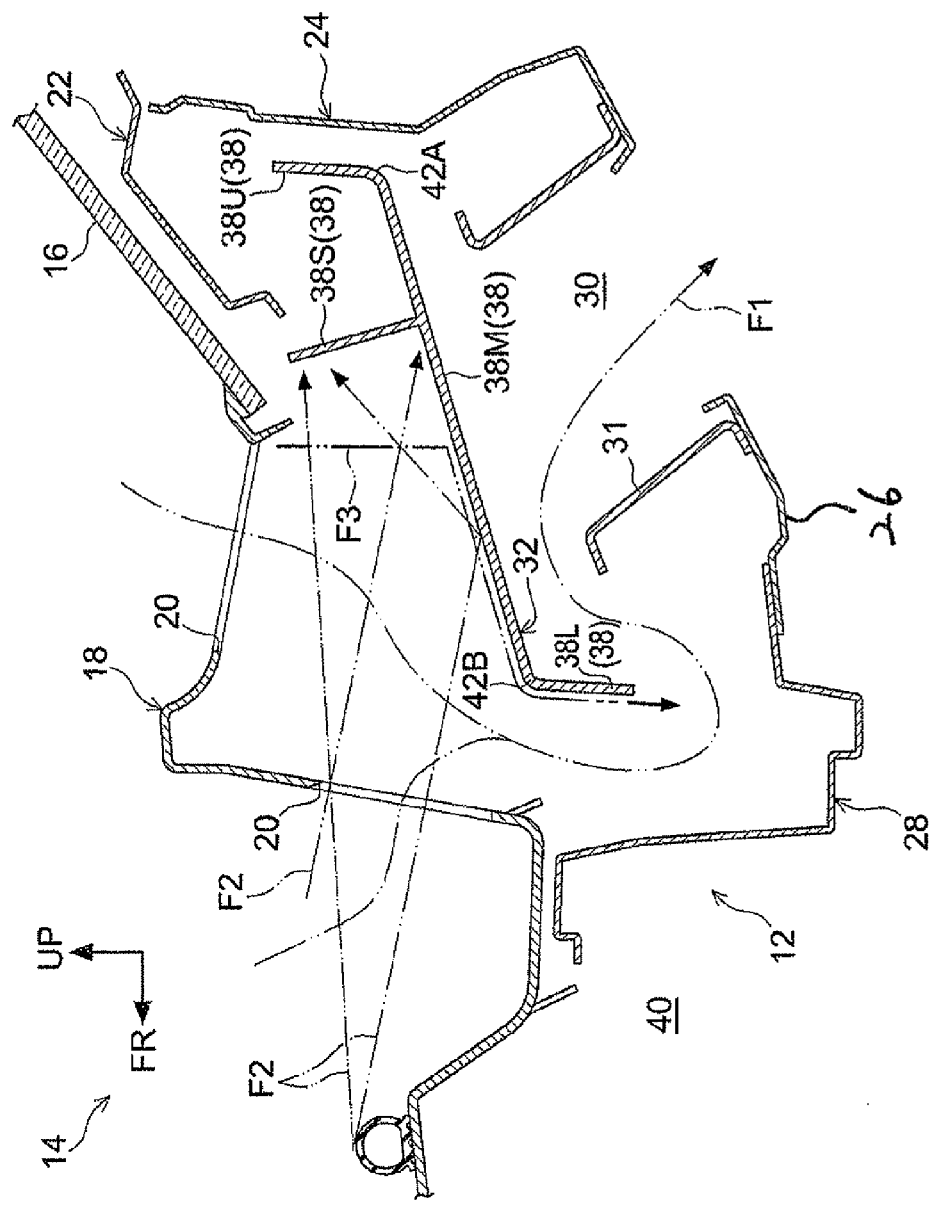
FIG. 2 is a sectional diagram taken along line 2-2 of FIG. 1, showing the automobile cowl structure in accordance with the first aspect of the present invention.
Figure 3:
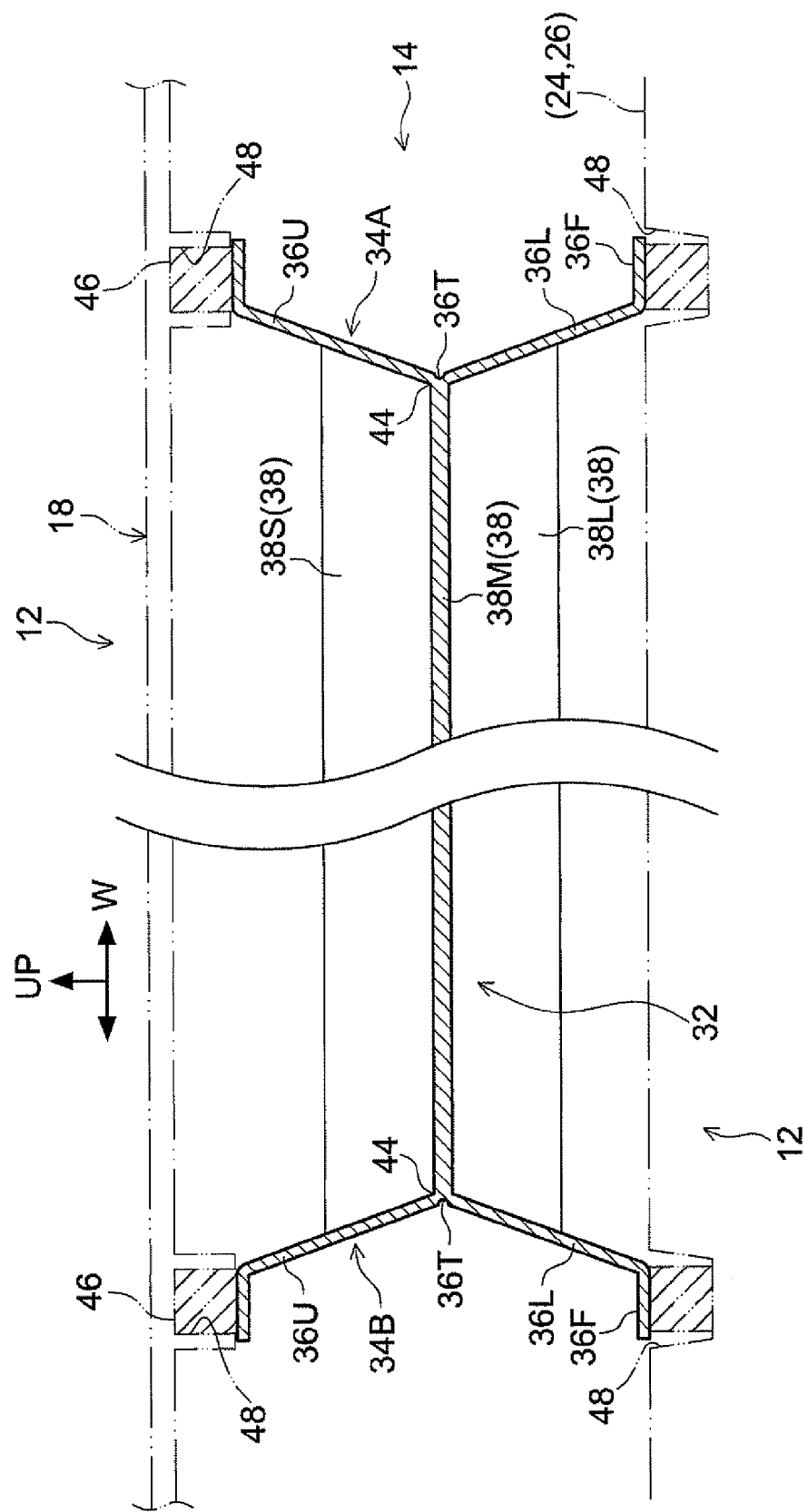
FIG. 3 is a sectional diagram taken along line 3-3 of FIG. 1, showing the automobile cowl structure in accordance with the first aspect of the present invention.

FIG. 1 shows a cowl portion 14 at which an automobile cowl structure 12 according to a first exemplary embodiment of the present invention is employed, in a perspective view. FIG. 2 and FIG. 3 show the cowl portion 14 in sectional views taken along, e width direction is indicated by arrow W, and an upward direction is indicated by arrow UP.

As shown in FIG. 2, the cowl portion 14 includes a cowl louver 18, which is disposed at the forward side of a front windshield 16 of the automobile. A plural number of inlet holes 20 are formed at predetermined positions of the cowl louver 18. Outside air may enter into the cowl portion 14 through these inlet holes 20.

A cowl outer 22 is disposed at the lower side of the front windshield 16. A cowl inner 24 is disposed at the lower side of the cowl outer 22. A cowl front 28 is disposed at the lower side of the cowl louver 18, at the forward side of a cowl lower 26.

The cowl portion 14 according to the present exemplary embodiment includes the cowl outer 22, the cowl inner 24 and the cowl front 28. The cowl portion 14 is covered by the cowl louver 18 from diagonally forward and upward thereof.

An aperture that penetrates through the cowl lower 26 in a plate thickness direction (a vehicle front-and-rear direction) is formed in the cowl lower 26. A duct member 31 is attached to the cowl lower 26 at a position at the upper side of this aperture. A duct aperture portion 30 is structured by this duct member and the aperture. As indicated by arrow F1, the outside air entering through the inlet holes 20 flows through this duct aperture portion 30 into the vehicle cabin.

In FIG. 2, an example in which the duct aperture portion 30 opens downward is presented. However, a structure in which the duct aperture portion 30 opens to a vehicle direction is possible.

As shown in FIG. 3, a screen member structural body 32 is disposed inside the cowl portion 14. The screen member structural body 32 includes two screen plates 34A and 34B, which are provided standing inside the cowl portion 14, and a guide plate 38 between the screen plates 34A and 34B. The guide plate 38 is connected to each of the screen plates 34A and 34B, and thus joins the screen plates 34A and 34B to one another.

The screen plate 34A features an operation of impeding flows of air in the vehicle width direction and thus preventing, for example, high-temperature air that enters from an engine compartment 40 from ingressing into the vehicle cabin through the duct aperture portion 30, or the like. The engine compartment 40 is an example of a power plant compartment relating to the present invention. For example, in an electric automobile, the power plant compartment is a compartment in which a motor for driving is accommodated.

The guide plate 38 covers the duct aperture portion 30 from upward and forward thereof. The guide plate 38 guides a liquid such as water entering into the cowl portion 14 or the like such that the liquid does not ingress into the duct aperture portion 30.

In particular, the guide plate 38 according to the present exemplary embodiment is disposed at the forward side at the lower side of the front windshield 16, and is formed in a shape that as a whole is inclined diagonally forward and downward. Thus, the guide plate 38 may cause water that has flowed down the surface of the front windshield 16 to flow diagonally forward and downward.

The guide plate 38 is disposed so as to cover the duct aperture portion 30 as viewed from the inlet holes 20 of the cowl louver 18. Therefore, even if, for example, high-pressure washing water enters into the cowl portion 14 through the inlet holes 20 as illustrated by arrow F2, the washing water is impeded from reaching the duct aperture portion 30.

As shown in FIG. 1, two inflected portions 42A and 42B are formed at the guide plate 38 in parallel along the vehicle width direction, spaced apart in an up-and-down direction. As can be seen in FIG. 2, a middle portion 38M is formed between the inflected portions 42A and 42B. The intermediate portion 38M has a shallower angle of inclination than an upper portion 38U at the upper side of the intermediate portion 38M and a lower portion 38L at the lower side of the same. The intermediate portion 38M substantially covers the duct aperture portion 30. Because the inflected portions 42A and 42B are inflected, stiffness of the guide plate 38 is raised.

A supplementary plate 38S is provided standing upward from the middle portion 38M of the guide plate 38. The supplementary plate 38S both further reinforces the middle portion 38M and features an operation of effectively impeding movements of liquid to the vehicle rearward side (for example, if the aforementioned high-pressure washing water or the like rebounds off the middle portion 38M as illustrated by arrow F2, this liquid may be moving diagonally upward and rearward.

As shown in FIG. 3, the two vehicle width direction end portions of the guide plate 38 are joined to the screen plates 34A and 34B at substantially middle portions thereof in the up-and-down direction. Each of the screen plates 34A and 34B includes an upper inflected portion 36U, at the upper side relative to a boundary 44 with the guide plate 38, and a lower inflected portion 36L at the lower side of the same. The upper inflected portion 36U and lower inflected portion 36L are examples of low-stiffness portions of the present invention.

The upper inflected portions 36U are inclined to directions (vehicle width direction outer sides) that progressively become more distant from one another toward the upper sides of the screen plates 34A and 34B. Meanwhile, the lower inflected portions 36L are inclined to directions that progressively become more distant from one another toward the lower sides of the screen plates 34A and 34B. Thus, each of the screen plates 34A and 34B is inflected about the boundary 44, and the upper portions and lower portions thereof are inflected in directions away from one another.

At each of the screen plates 34A and 34B, a linear trough portion 36T at which the plate thickness is locally reduced from the vehicle width direction outer side is formed at the boundary 44. The stiffnesses of the screen plates 34A and 34B are locally reduced by the trough portions 36T. The trough portion 36T is an example of a weakened portion of the present invention.

Respective outer edge portions of the screen plates 34A and 34B are inflected to the vehicle width direction outer sides thereof. Thus, flange plates 36F are formed. Resilient members 46 (see FIG. 3, not shown in FIG. 1), which are constituted of porous resin, rubber or the like, are adhered to outer peripheries of the flange plates 36F. The resilient members 46 sandwich the outer edge portions of the screen plate 34A.

Accommodation channels 48 are formed in the cowl inner 24, the cowl lower 26 and the cowl louver 18. The accommodation channels 48 are formed at positions that correspond with the resilient members 46 in a state in which the screen plates 34A and 34B are disposed at predetermined positions in the cowl portion 14. The resilient members 46 are accommodated in the accommodation channels 48. Thus, the screen plates 34A and 34B are retained at the predetermined positions in the cowl portion 14 and do not move unintendedly.

Now, operation of the automobile cowl structure 12 according to the present exemplary embodiment is described.

In the automobile cowl structure 12 according to the present exemplary embodiment, as can be seen from FIG. 1 to FIG. 3, the two screen plates 34A and 34B disposed inside the cowl portion 14 are joined by the guide plate 38. Thus, the screen member structural body 32 is structured. That is, the screen plates 34A and 34B and the guide plate 38 are made integral. Therefore, a number of components is smaller than in a structure in which the screen plates 34A and 34B and the guide plate 38 are respectively separate bodies.

In addition, because the screen plates 34A and 34B and the guide plate 38 are integral, the screen plates 34A and 34B and the guide plate 38 may be disposed at predetermined positions inside the cowl portion 14 simply by the integrated screen member structural body 32 being placed in the cowl portion 14.

Thus, in the automobile cowl structure 12 according to the present exemplary embodiment, assembly of the screen plates 34A and 34B and the guide plate 38 to the cowl portion 14 is easier than with a structure in which the screen plates 34A and 34B and the guide plate 38 are respectively separate bodies. Moreover, the number of components is smaller than in a structure in which the screen plates 34A and 34B and the guide plate 38 are respectively separate bodies. Therefore, the automobile cowl structure 12 may be structured at low cost.

In a structure in which the screen plates 34A and 34B are separately disposed in the cowl portion 14, there is a need to engage the screen plates 34A and 34B with clips or the like in order to prevent the screen plates 34A and 34B from tipping over. In contrast, when the two screen plates 34A and 34B are joined and integrated as in the present exemplary embodiment, the screen member structural body 32 has a predetermined overall length in the vehicle width direction. Therefore, the screen plates 34A and 34B may be disposed so as not to tip over simply by the screen member structural body 32 being placed in the cowl portion 14.

In the screen member structural body 32, the guide plate 38 is retained between the screen plates 34A and 34B. Therefore, the guide plate 38 may be reliably retained at a predetermined position. Thus, a state in which the guide plate 38 is disposed upward and forward of the duct aperture portion 30 may be maintained. Therefore, liquids such as water flowing down from the front windshield 16, high-pressure washing water entering through the inlet holes 20 or the like may be effectively impeded from reaching the duct aperture portion 30.

A liquid such as rainwater or the like flows down from the front windshield 16 to the guide plate 38. This liquid moves along the vehicle width direction on the guide plate 38 while flowing downward as illustrated by arrow F3 in FIG. 2. The liquid is then drained through the cowl front 28 and the like.

In particular, in the present exemplary embodiment the whole area of the duct aperture portion 30 as viewed from above may be covered by the guide plate 38. Therefore, even though the inlet holes 20 are formed in the cowl louver 18 at positions above the duct aperture portion 30, entry of liquids through the duct aperture portion 30 may be suppressed. In addition, because the inlet holes 20 are formed at positions above the duct aperture portion 30, a structure in which air may be efficiently introduced may be realized.

In the present exemplary embodiment, the guide plate 38 may be disposed at a predetermined position without being welded to the cowl louver 18 or the like. Therefore, a spacing between the guide plate 38 and the cowl louver 18 may be assuredly wider than in a structure in which the guide plate 38 is welded to the cowl louver 18. Hence, amounts of water that can be guided by the guide plate 38 may be assuredly larger.

In a structure in which the guide plate 38 is welded to the cowl louver 18, there is a need for the guide plate 38 to be locally protruded upward at a welded portion, and for a distal end of the protrusion to be welded to the cowl louver 18. However, because this welding portion is protruded upward, it acts as a dam when a liquid is flowing down. That is, it is difficult to guide water downward on the guide plate past the protrusion portion (the welded portion). Consequently, while flowing down the guide plate, the liquid may spill over from the two length direction ends of the guide plate 38 at positions close to the duct aperture portion 30. In contrast, in the present exemplary embodiment there is no need to provide an upward protrusion portion for welding at the guide plate 38. Therefore, a liquid flowing down on the guide plate 38 is not obstructed by a protrusion portion. Therefore, the liquid may be guided to front end positions of the guide plate 38, that is, positions that are distant from the duct aperture portion 30.

Furthermore, because there is no need to specify positions for welding the guide plate 38 to the cowl louver 18, there are fewer restrictions on positions and shapes in which the inlet holes 20 are formed. For example, the inlet holes 20 may be formed at positions such that outside air may be more efficiently introduced.

Figure 4:
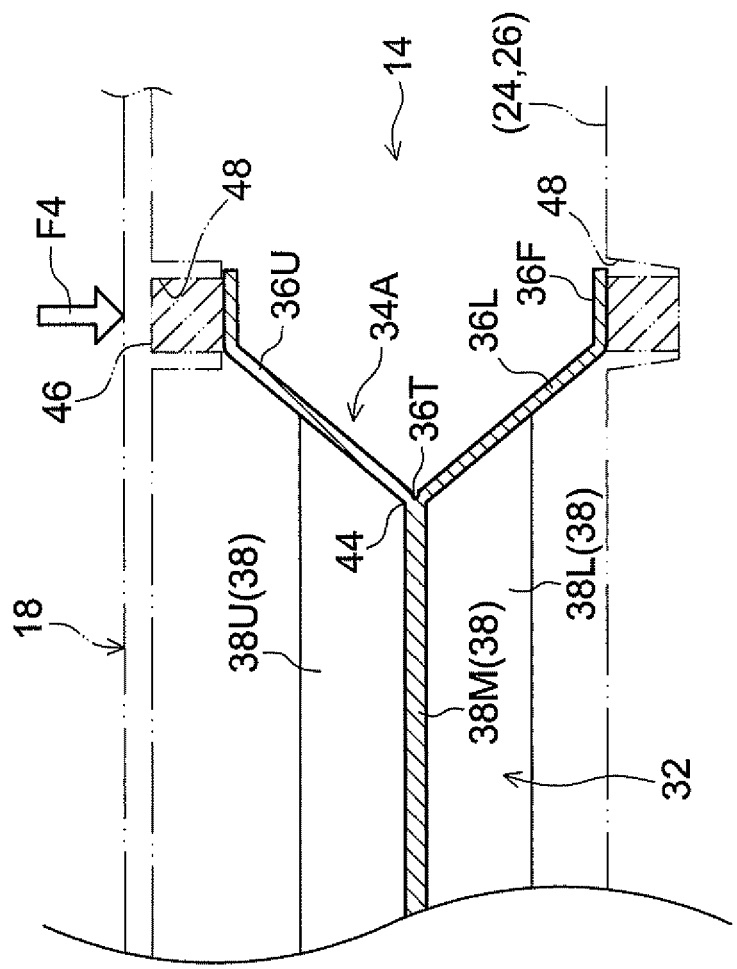
FIG. 4 is a sectional diagram showing the automobile cowl structure in accordance with the first aspect of the present invention in a state in which a screen plate is deformed.

In the automobile cowl structure 12 according to the present exemplary embodiment, both of the screen plates 34A and 34B are inflected at up-and-down direction middle portions thereof (the boundaries 44). In addition, the trough portion 36T is formed at each boundary 44. Thus, the stiffness of the screen plate 34A or 34B is locally reduced. Therefore, if an impact F4 is applied from the upper side as shown in FIG. 4 and a load acts on the screen plate 34A or the screen plate 34B, the screen plate 34A or screen plate 34B buckles at the boundary 44. Thus, the load (energy) of the impact is absorbed. Therefore, a head injury criteria value (HTC value) is reduced and the automobile cowl structure has excellent pedestrian protection performance.

FIG. 5 and FIG. 6 show an automobile cowl structure 112 according to a second exemplary embodiment of the present invention. Structural elements, members and the like of the second exemplary embodiment that are the same as in the first exemplary embodiment are assigned the same reference numerals and are not described in detail.

In a screen member structural body 132 according to the second exemplary embodiment, a guide plate 138 that is different from the guide plate 38 according to the first exemplary embodiment is used. The overall shape of the guide plate 138 is similar to the guide plate 38 of the first exemplary embodiment. However, a plural number of furrows 140 are formed along the up-and-down direction, with a constant spacing in the vehicle width direction. In this respect, the guide plate 138 differs from the first exemplary embodiment. Each of the creases 140 continues past the supplementary plate 38S partway between a top edge 138T and a bottom edge 138B of the guide plate 138.

Figure 7A:
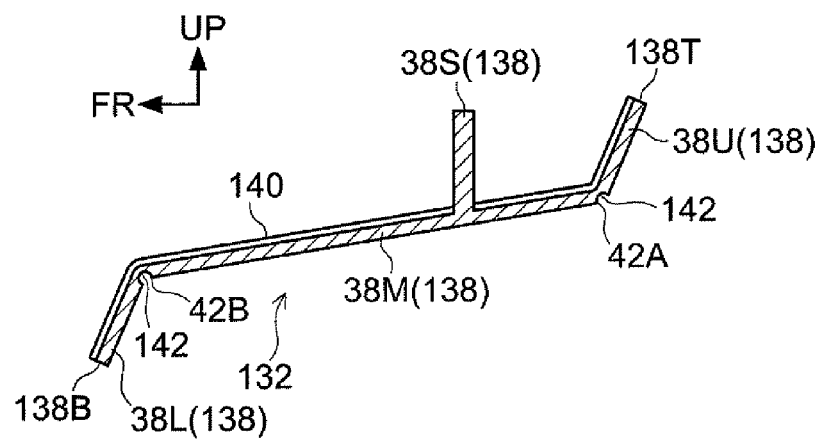
FIG. 7A is a sectional diagram showing a screen plate structural body that is used in the automobile cowl structure in accordance with the second exemplary embodiment of the present invention, in an undeformed state.
Figure 7B:
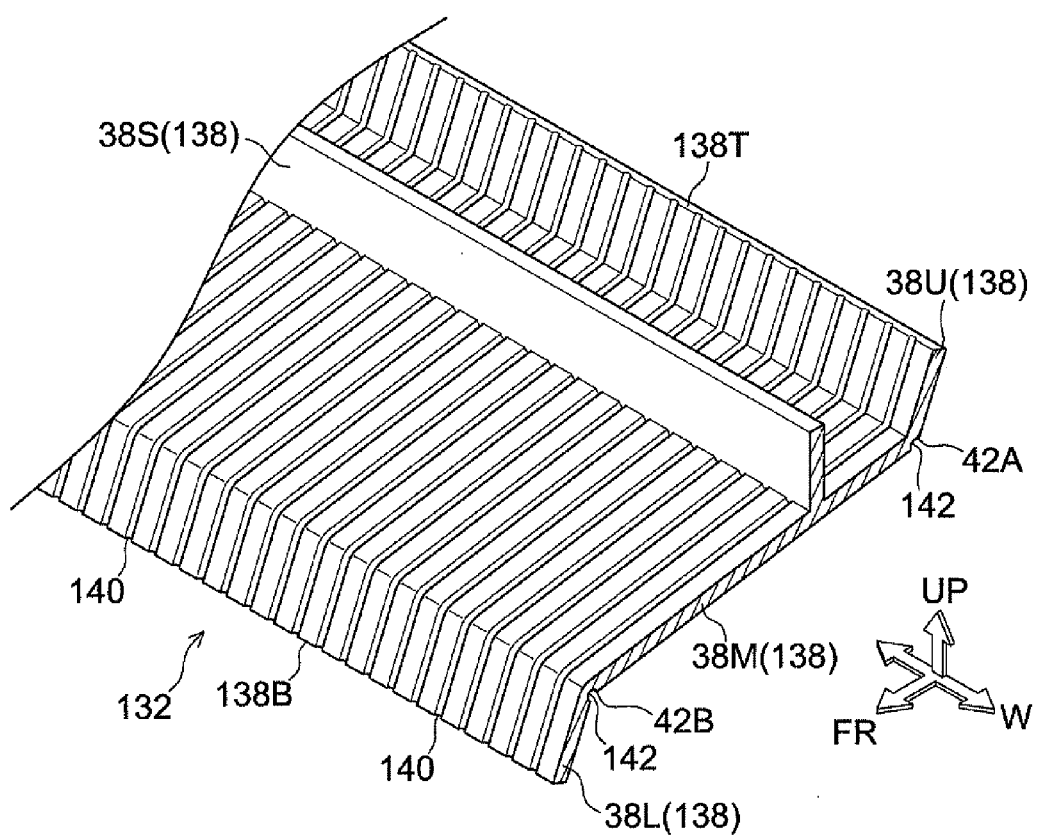
FIG. 7B is a partially cutaway sectional diagram showing the screen plate structural body that is used in the automobile cowl structure in accordance with the second exemplary embodiment of the present invention in the undeformed state.

As is shown in detail in FIG. 7A and FIG. 7B, the furrows 140 are formed in trench shapes in the upper face side of the guide plate 138. The guide plate 138 is weakened at portions by these furrows 140. Therefore, the guide plate 138 according to the second exemplary embodiment is deformed more easily by a load from the upper side than the guide plate 38 according to the first exemplary embodiment in which the furrows 140 are not formed. The furrows 140 are an example of the weakened portion of the present invention.

As an example of this deformation, a deformation can be mentioned in which, for example, the guide plate 138 is deformed to inflect at regions of the furrows 140, this inflecting deformation occurs at a plural number of the furrows 140, and the guide plate 138 as a whole goes into a curved shape.

Furrows 142 are formed at the rear face of the guide plate 138, at positions of the inflected portions 42A and 42B. Because of these furrows 142, if an impact acts from the upper side, the guide plate 138 is easily changed to a flat shape overall (see FIG. 8A and FIG. 8B) by the impact.

With the automobile cowl structure 112 according to the second exemplary embodiment with this structure, the same operations and effects as with the automobile cowl structure 12 according to the first exemplary embodiment are provided.

Moreover, in the automobile cowl structure 112 according to the second exemplary embodiment, if an impact acts on the guide plate 138 from the upper side, this impact may be effectively absorbed by deformation of the guide plate 138.

That is, in the state in which no impact has acted on the guide plate 138, as shown in FIG. 7A and FIG. 7B, the guide plate 138 maintains the state into which the inflected portions 42A and 42B were inflected beforehand, being in a shape in which the upper portion 38U and the lower portion 38L are inflected with respect to the middle portion 38M. Therefore, in this guide plate 138, stiffness is higher than in a guide plate that is formed in a flat shape overall, and there is no unintended deformation at the furrows 140.

Figure 8A:
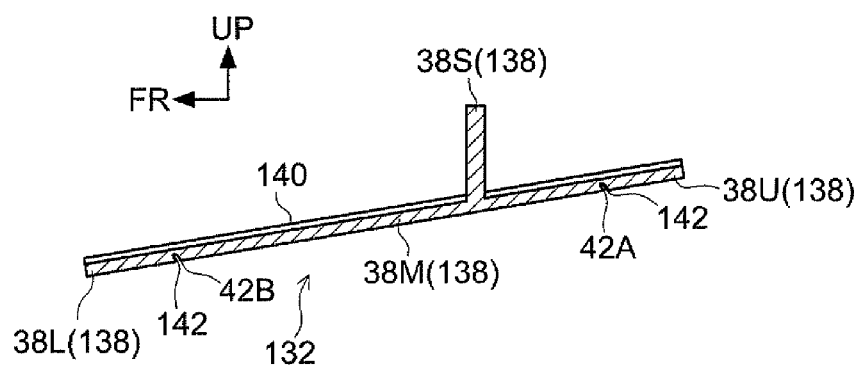
FIG. 8A is a sectional diagram showing a state in which the screen plate structural body that is used in the automobile cowl structure in accordance with the second exemplary embodiment of the present invention is being deformed.
Figure 8B:
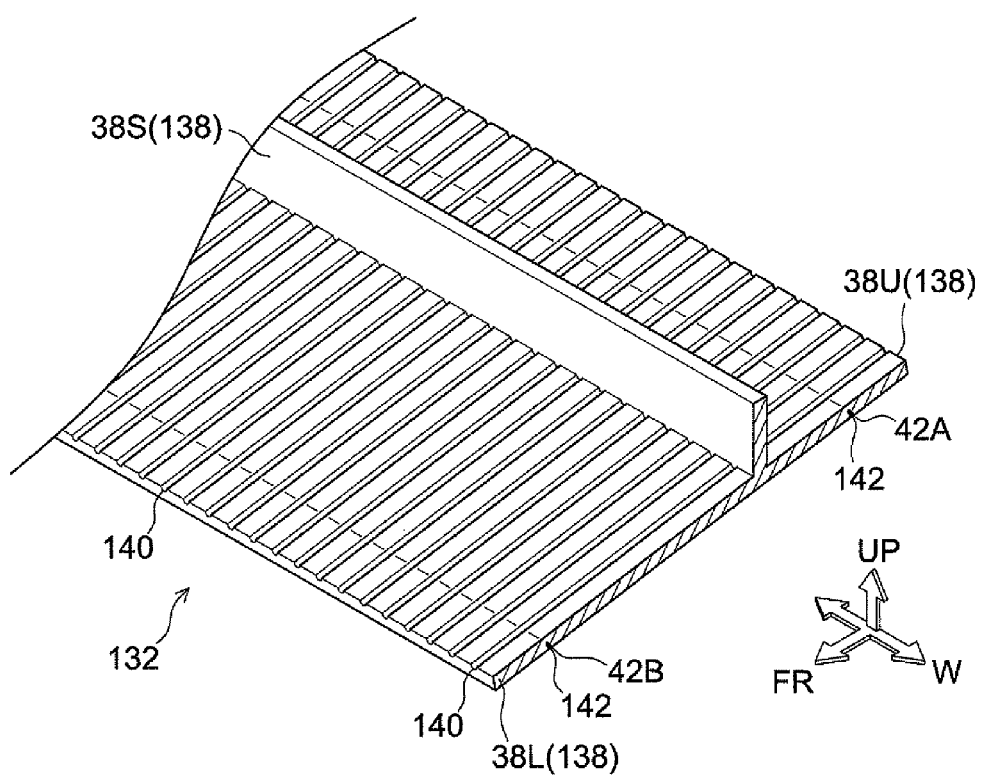
FIG. 8B is a partially cutaway sectional diagram showing the state in which the screen plate structural body that is used in the automobile cowl structure in accordance with the second exemplary embodiment of the present invention is being deformed.

If an impact acts on the guide plate 138 from the upper side, the inflections of the inflected portions 42A and 42B are removed at a length direction middle region of the guide plate 138, as shown in FIG. 8A and FIG. 8B, and the guide plate 138 changes to an overall flat shape.

When the guide plate 138 has changed to the flat shape, because the furrows 140 are formed in the guide plate 138, the guide plate 138 is deformed by the load, for example, as shown in FIG. 9. Alternatively, as mentioned above, the guide plate 138 may deform into a curved shape overall.

Thus, in the automobile cowl structure 112 according to the second exemplary embodiment, if a load acts on the guide plate 138 from the upper side, this load (energy) may be effectively absorbed by deformation of the guide plate 138.

FIG. 10 shows an automobile cowl structure 212 according to a third exemplary embodiment of the present invention. Structural elements, members and the like of the third exemplary embodiment that are the same as in the first exemplary embodiment or the second exemplary embodiment are assigned the same reference numerals and are not described in detail.

In a screen member structural body 232 according to the third exemplary embodiment, the guide plate 138 in which the furrows 140 are formed is used, the same as in the screen member structural body 132 according to the second exemplary embodiment. However, the structures of screen plates 234A and 234B at the two vehicle width direction ends of the guide plate 138 are different.

The screen plate 234A according to the third exemplary embodiment is formed in a flat shape overall, with the upper inflected portion 36U and the lower inflected portion 36L being inflected in the same direction. The screen plate 234B is also formed in a flat shape overall, with the upper inflected portion 36U and the lower inflected portion 36L being inflected in the same direction. The screen plate 234A and the screen plate 234B are inflected in directions such that the upper sides thereof are further apart in the vehicle width direction (the lower sides are closer together in the vehicle width direction).

Positioning ribs 240 are formed at one or both of the cowl inner 24 and the cowl lower 26. The positioning ribs 240 touch against the screen plates 234A and 234B and position the screen member structural body 232 in the vehicle width direction. In particular, in the present exemplary embodiment, the positioning ribs 240 are formed at positions that touch against the screen plates 234A and 234B from vehicle width direction outer sides thereof.

Thus, in the automobile cowl structure 212 according to the third exemplary embodiment, when the screen member structural body 232 is disposed in the cowl portion 14, the screen member structural body 232 is disposed such that the respective screen plates 234A and 234B are disposed at the vehicle width direction inner sides of the corresponding positioning ribs 240. Therefore, the screen member structural body 232 may be disposed at a predetermined position simply by being placed in the cowl portion 14.

With the automobile cowl structure 212 according to the third exemplary embodiment, substantially the same operations and effects as with the automobile cowl structure 212 according to the second exemplary embodiment are provided. However, actions of the screen plates 234A and 234B when a load acts on the screen plates 234A and 234B from the upper side are different from in the second exemplary embodiment.

Figure 11:
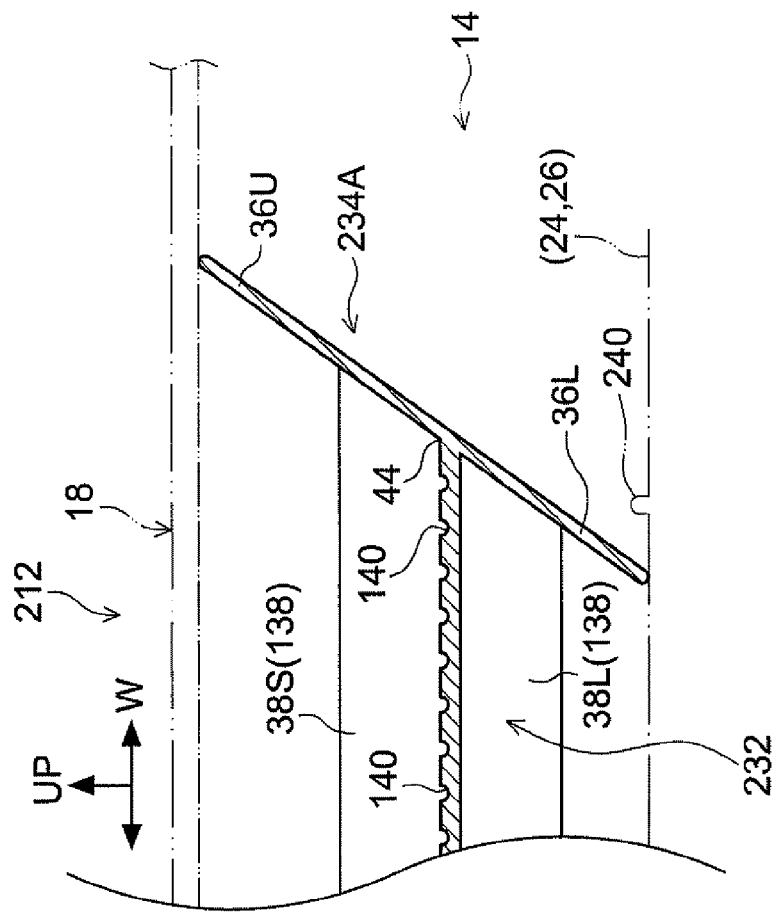
FIG. 11 is a sectional diagram showing the automobile cowl structure in accordance with the third exemplary embodiment of the present invention, in a state in which the screen plate structural body has been deformed.

That is, because the screen plates 234A and 234B according to the third exemplary embodiment are not inflected and the trough portions 36T are not formed at the boundaries 44, as shown in FIG. 11, the screen plates 234A and 234B do not buckle even when a load acts on the screen plate 234A (or the screen plate 234B) from the upper side. However, the screen plates 234A and 234B absorb an impact (energy) by tipping about the boundaries 44 in directions such that the upper sides thereof move away from one another.

The positioning ribs 240 position the screen member structural body 232 by touching against the respective lower end portions of the screen plates 234A and 234B at the vehicle width direction outer sides relative to the screen plates 234A and 234B. Therefore, if the screen plates 234A and 234B are tipped over by an impact from the upper side, the positioning ribs 240 do not obstruct this tipping.

Figure 12:
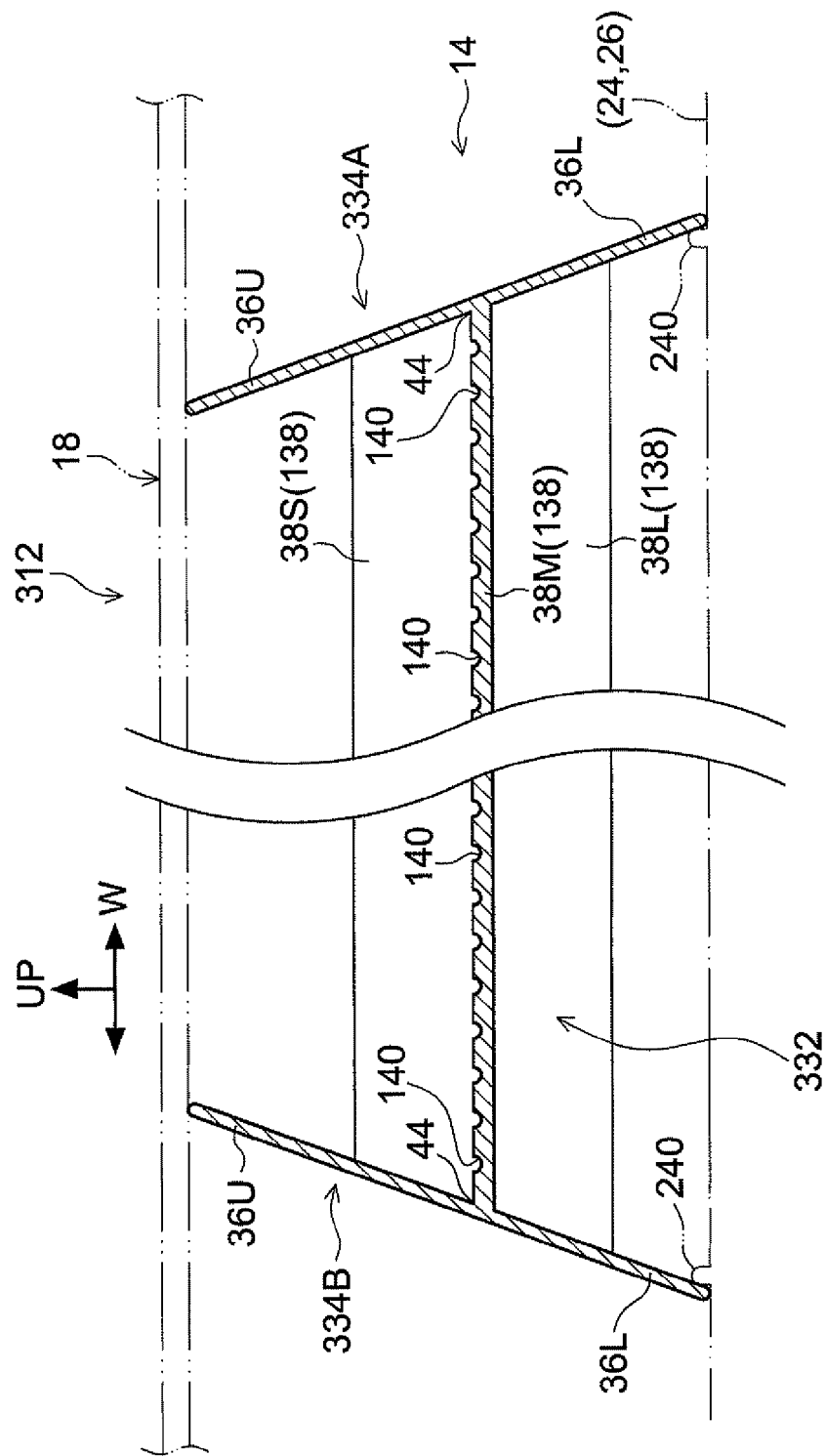
FIG. 12 is a sectional diagram showing an automobile cowl structure in accordance with a fourth exemplary embodiment of the present invention, in a state in which a screen plate structural body is undeformed.

FIG. 12 shows an automobile cowl structure 312 according to a fourth exemplary embodiment of the present invention. Structural elements, members and the like of the fourth exemplary embodiment that are the same as in the first to third exemplary embodiments are assigned the same reference numerals and are not described in detail.

In a screen member structural body 332 according to the fourth exemplary embodiment, directions of inclination of screen plates 334A and 334B are different from in the third exemplary embodiment. That is, the screen plate 334A and screen plate 334B are inclined such that the upper sides thereof are closer together in the vehicle width direction and the lower sides thereof are further apart in the vehicle width direction.

Positioning ribs 340 according to the fourth exemplary embodiment are formed at positions that touch against the screen plates 334A and 334B from the vehicle width direction inner sides thereof.

Figure 13:
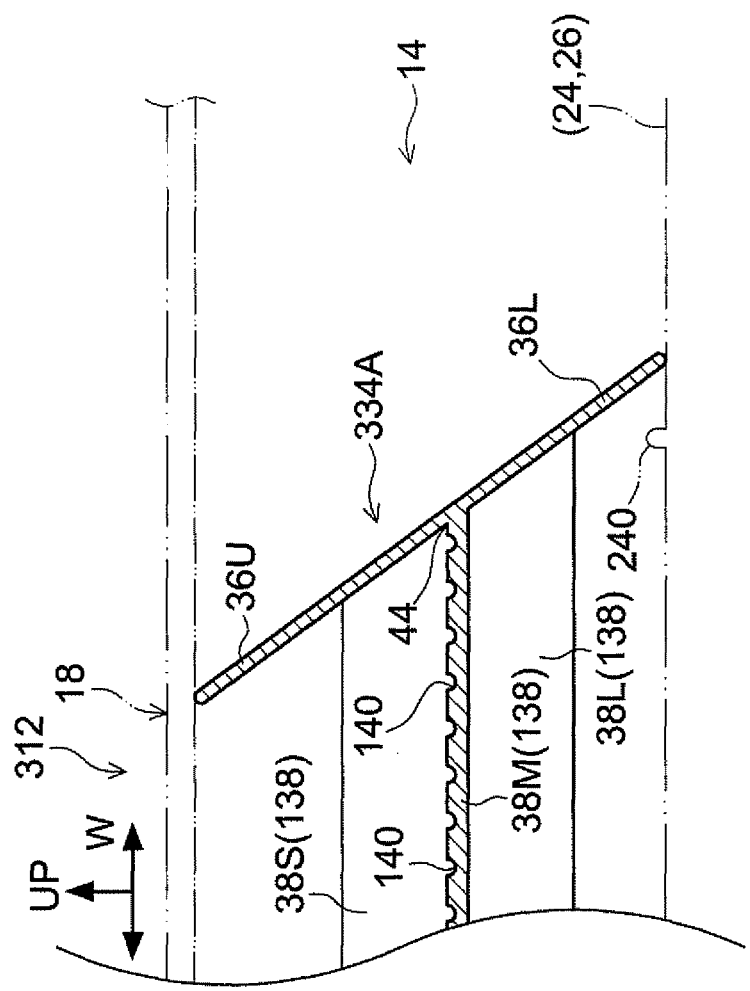
FIG. 13 is a sectional diagram showing the automobile cowl structure in accordance with the fourth exemplary embodiment of the present invention, in a state in which the screen plate structural body has been deformed.

With the automobile cowl structure 312 according to the fourth exemplary embodiment, substantially the same operations and effects as with the automobile cowl structure 212 according to the third exemplary embodiment are provided. However, directions of tipping of the screen plates 334A and 334B when a load acts from the upper side are different from the third exemplary embodiment. That is, as shown in FIG. 13, in the fourth exemplary embodiment the screen plates 334A and 334B absorb an impact (energy) by tilting in directions such that the upper sides thereof approach one another.

Figure 14:
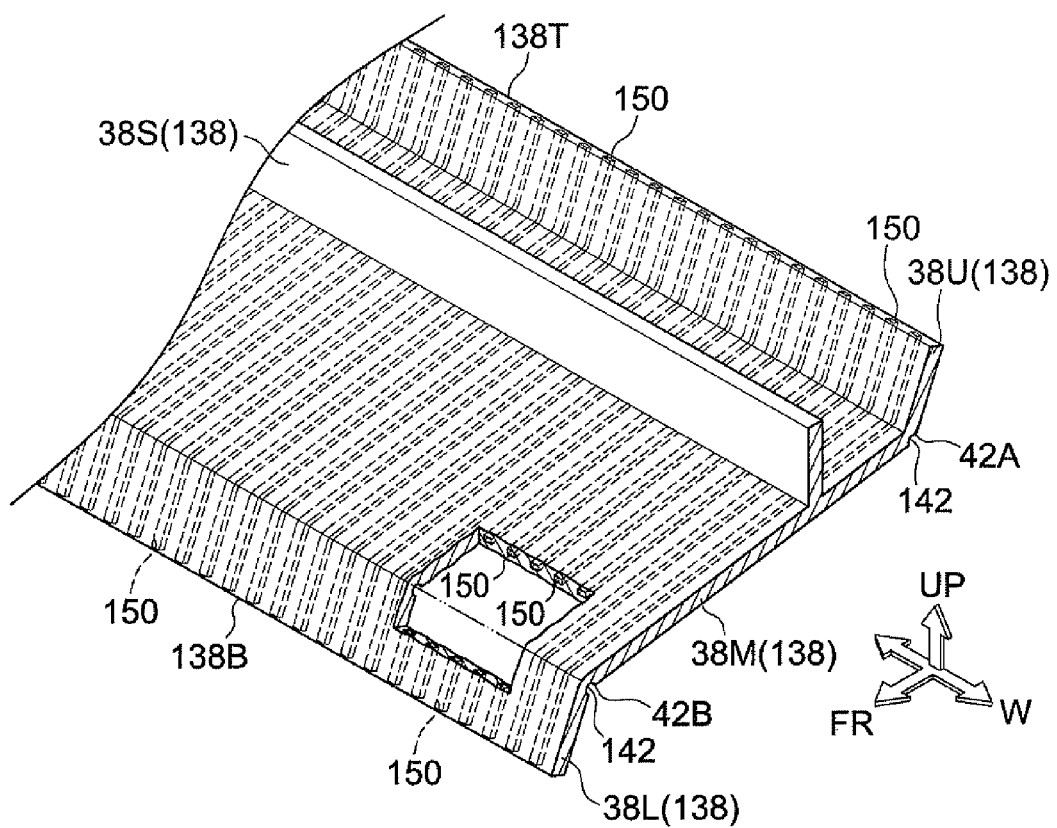
FIG. 14 is a partially cutaway sectional diagram showing the screen plate structural body that is used in an automobile cowl structure in accordance with any of the second to fourth exemplary embodiments of the present invention in the undeformed state.

In the second to fourth exemplary embodiments described above, the furrows 140 at which the guide plate 138 is reduced in plate thickness in linear shapes are mentioned as an example of the weakened portion of the present invention. However, the weakened portion is not limited to the furrows 140 (reduced plate thickness portions at which the guide plate 138 is locally made thinner), provided the guide plate 138 can be weakened and the stiffness lowered at portions thereof. For example, as illustrated in FIG. 14, a structure is possible in which a plural number of penetrating holes 150 that penetrate from the top edge 138T to the bottom edge 138B of the guide plate 138 are formed with a constant spacing in the vehicle width direction. In this structure too, because the guide plate 38 is locally weakened at portions at which the penetrating holes 150 are formed, an impact (energy) from the upper side may be absorbed by deformation more effectively than in a guide plate in which these penetrating holes 150 are not formed. On the other hand, if the furrows 140 are formed as in the second to fourth exemplary embodiments, the weakened portion may be provided by a simple structure.

The number of weakened portions is not necessarily a plural number. For example, even if a weakened portion is formed at only one location of the guide plate 138, an impact (energy) may be absorbed by this weakened portion being deformed by a load from the upper side.

In the above descriptions, structures in which two screen plates are provided inside the cowl portion 14 are presented. However, the number of screen plates may be three or more. In a structure in which three or more screen plates are provided, it is sufficient that the respective screen plates be joined by a guide plate and integrated as a whole.

In a structure in which a screen plate includes inclined portions (an upper inclined portion and a lower inclined portion), it is not necessary for the screen plate to be wholly inclined, and structures are possible in which a portion of the screen plate is in line with the vertical direction. For example, in the first exemplary embodiment or the second exemplary embodiment, a structure is possible in which a predetermined range at the upper side and the lower side of the boundary 44 is provided standing in the vertical direction, and portions at the upper side and the lower side of this vertical portion are inclined. In this structure, the low-stiffness portion of the present invention may be provided at the vertical portion or at a boundary between the vertical portion and an inclined portion.

The invention claimed is:

1. A cowl structure for an automobile, the cowl structure comprising:
    a guide plate that is disposed in a cowl portion of a vehicle and guides at least liquid that ingresses into the cowl portion through a cowl louver toward a vehicle forward side; and
    a plurality of screen plates that are provided standing inside the cowl portion, that impede movement in a vehicle width direction of air that enters from a power plant compartment, and that are joined by the guide plate, at least one of an upper side portion or a lower side portion of each screen plate, relative to a boundary with the guide plate, being an inclined portion that is inclined from a vertical direction, wherein
    the inclined portion includes:
        an upper inclined portion at an upper side relative to a region of the boundary; and
        a lower inclined portion at a lower side relative to the region of the boundary, the lower inclined portion being inclined in a different direction from the upper inclined portion, and
    a low-stiffness portion, at which the screen plate is locally low in stiffness, is provided between the upper inclined portion and the lower inclined portion.

2. The cowl structure for an automobile according to claim 1, wherein each of the plurality of screen plates is flat and is disposed to be inclined with respect to the vertical direction.

3. The cowl structure for an automobile according to claim 1, wherein the guide plate includes a weakened portion at which a bending strength of the guide plate with respect to a load from a vehicle outer side is reduced.

4. The cowl structure for an automobile according to claim 3, wherein the weakened portion is a reduced plate thickness portion at which the guide plate is locally reduced in thickness along an up-and-down direction.

5. The cowl structure for an automobile according to claim 3, wherein the weakened portion is plurally provided, the weakened portions being spaced apart in a vehicle width direction.

6. A cowl structure for an automobile, the cowl structure comprising:
- a plurality of screen plates that are provided standing inside a cowl portion of a vehicle, the screen plates impeding movement in a vehicle width direction of air that enters from a power plant compartment; and
- a guide plate that guides at least liquid that ingresses into the cowl portion through a cowl louver toward a vehicle forward side, the guide plate joining the plurality of screen plates, wherein
- at least a portion of one or more of the plurality of screen plates, at least at one of an upper side portion or a lower side portion relative to a boundary with the guide plate, is an inclined portion that is inclined from a vertical direction,
- the inclined portion includes:
  - an upper inclined portion at an upper side relative to a region of the boundary; and
  - a lower inclined portion at a lower side relative to the region of the boundary, the lower inclined portion being inclined in a different direction from the upper inclined portion, and
- a low-stiffness portion, at which the screen plate is locally low in stiffness, is provided between the upper inclined portion and the lower inclined portion.

7. The cowl structure for an automobile according to claim 6, wherein each of the plurality of screen plates is flat and is disposed to be inclined with respect to the vertical direction.

8. The cowl structure for an automobile according to claim 6, wherein the guide plate includes a weakened portion at which a bending strength of the guide plate with respect to a load from a vehicle outer side is reduced.

9. The cowl structure for an automobile according to claim 8, wherein the weakened portion is a reduced plate thickness portion at which the guide plate is locally reduced in thickness along an up-and-down direction.

* * * * *